United States Patent [19]

Marechal et al.

[11] Patent Number: 4,854,958
[45] Date of Patent: Aug. 8, 1989

[54] PROCESS TO MOLD PRECISION GLASS ARTICLES

[75] Inventors: Jean-Pierre Marechal, Grez-sur-Loing, France; Richard O. Maschmeyer, Corning, N.Y.

[73] Assignee: Corning Glass Works, Corning, N.Y.

[21] Appl. No.: 131,838

[22] Filed: Dec. 11, 1987

Related U.S. Application Data

[60] Division of Ser. No. 850,180, Apr. 10, 1986, which is a division of Ser. No. 643,412, Aug. 22, 1984, abandoned, which is a continuation of Ser. No. 515,662, Jul. 20, 1983, Pat. No. 4,481,023, which is a continuation of Ser. No. 316,861, Oct. 31, 1981, abandoned.

[51] Int. Cl.$^4$ .............................................. C03B 11/00
[52] U.S. Cl. ........................................... 65/64; 65/85; 65/102; 65/111; 65/275
[58] Field of Search ............... 65/64, 68, 76, 85, 102, 65/104, 106, 108, 117, 111, 275; 264/2.4, 2.7, 235; 425/808

[56] References Cited

U.S. PATENT DOCUMENTS

| | | | |
|---|---|---|---|
| 229,976 | 7/1880 | Denman | 65/104 |
| 1,332,724 | 3/1920 | Hill | 65/104 |
| 2,551,311 | 5/1951 | Batchell | 65/104 |
| 2,718,106 | 12/1955 | Herman et al. | 425/808 |
| 3,794,704 | 2/1974 | Strong | 264/1 |
| 3,900,328 | 8/1975 | Parsons | 65/68 |
| 4,012,215 | 3/1977 | Schwab et al. | 425/808 |
| 4,199,342 | 4/1980 | Mestre | 65/106 |
| 4,348,484 | 9/1982 | Joormann et al. | 501/45 |

FOREIGN PATENT DOCUMENTS

| | | | |
|---|---|---|---|
| 501283 | 6/1930 | Fed. Rep. of Germany . | |
| 56-00378 | 1/1981 | Japan . | |
| 617391 | 7/1978 | U.S.S.R. | 65/104 |
| 814906 | 3/1981 | U.S.S.R. | 65/275 |

OTHER PUBLICATIONS

Derwent Publications Week 42—1985, pp. 3 and 6.

*Primary Examiner*—Kenneth M. Schor
*Attorney, Agent, or Firm*—Walter S. Zebrowski

[57] ABSTRACT

The present invention is directed to a four-step process for molding glass articles of high precision and excellent surface figure. A glass preform having an overall geometry closely approximating that of the desired final product is placed into a mold, the mold and preform are brought to a temperature at which the glass exhibits a viscosity between $10^8$–$10^{12}$ poises, a load is applied to shape the glass into conformity with the mold, and thereafter the glass shape is removed from the mold at a temperature above the transformation range of the glass and annealed.

5 Claims, 1 Drawing Sheet

PROCESS TO MOLD PRECISION GLASS ARTICLES

This is a division of application Ser. No. 850,180, filed Apr. 10, 1986 which application is a division of Ser. No. 643,412, filed Aug. 22, 1984, which application is a continuation of application Ser. No. 515,662, filed July 20, 1983, now U.S. Pat. No. 4,481,023, which application is a continuation of Ser. No. 316,861, filed Oct. 31, 1981, now abandoned.

BACKGROUND OF THE INVENTION

Precision optical elements require highly polished surfaces of exacting figure and surface quality. The surfaces demand fabrication in proper geometric relation to each other and, where the elements are to be used in transmission applications, they will be prepared from a material of controlled, uniform, and isotropic refractive index.

Precision optical elements of glass are customarily produced via one of two complex, multi-step processes. In the first, a glass batch is melted in a conventional manner and the melt formed into a glass body having a controlled and homogeneous refractive index. Thereafter, the body may be reformed utilizing well-known repressing techniques to yield a shape approximating the desired final article. The surface figure and finish of the body at this stage of production, however, are not adequate for image forming optics. The rough article is fine annealed to develop the proper refractive index and the surface figure improved via conventional grinding practices. In the second method, the glass melt is formed into a bulk body which is immediately fine annealed and subsequently cut and ground to articles of a desired configuration.

Both processes are subject to similar limitations. The surface profiles that are produced through grinding are normally restricted to conic sections, such as flats, spheres, and parabolas. Other shapes and, in particular, general aspheric surfaces are difficult to grind. In both processes, the ground optical surfaces are polished employing conventional, but complicated, polishing techniques which strive to improve surface finish without compromising the surface figure. In the case of aspheric surfaces, this polishing demands highly skilled and expensive hand working. A final finishing operation, viz., edging, is commonly required. Edging insures that the optical and mechanical axis of a spherical lens coincide. Edging, however, does not improve the relationship of misaligned aspheric surfaces, which factor accounts in part for the difficulty experienced in grinding such lenses.

It is quite apparent that direct molding of lenses to the finished state could, in principle, eliminate the grinding, polishing, and edging operations, which are especially difficult and time consuming for aspheric lenses. Indeed, molding processes are utilized for fabricating plastic lenses. Nevertheless, existing plastics suitable for optical applications are available in a limited refractive index and dispersion range only. Furthermore, many plastics scratch easily and are prone to the development of yellowing, haze, and birefringence. The use of abrasion resistant and anti-reflective coatings has not fully solved those failings. Moreover, plastic optical elements are subject to distortion from mechanical forces, humidity, and heat. Both the volume and refractive index of plastics vary substantially with changes in temperature, thereby limiting the temperature interval over which they are useful.

In sum, the overall properties of glass render it generally superior to plastic as an optical material. Conventional hot pressing of glass, however, does not provide the exacting surface figures and surface qualities demanded for image forming optics. The presence of chill wrinkles in the surface and surface figure deviations constitute chronic afflictions. As observed above, similar problems can be encountered in conventional repressing techniques.

Various schemes have been devised to correct those problems, such devices frequently involving isothermal pressing, i.e., utilizing heated molds so that the temperature of the glass being molded will be essentially the same as that of the molds, the use of gaseous environments inert to the glass and mold materials during the pressing operation, and/or the use of materials of specifically defined compositions in the construction of the molds.

For example, U.S. Pat. No. 2,410,616 describes an apparatus and method for molding glass lenses. The molds are capable of being heated and the temperatures thereof controlled within narrow ranges compatible with the glasses being molded. An inert or reducing gas environment (preferably hydrogen) is used in contact with the mold surfaces to inhibit oxidation thereof. The principal inventive disclosure involves the use of a flame curtain (normally burning hydrogen) over the opening of a chamber enclosing the molds to prevent the entrance of air thereinto. No working example specifically illustrating molding process parameters is provided.

U.S. Pat. No. 3,833,347 is also directed to an apparatus and method for press molding glass lenses. Again, the molds are capable of being heated and the temperature thereof closely controlled. An inert gas surrounds the molds to preclude oxidation thereof. The inventive disclosure contemplates the use of mold surfaces composed of glasslike carbon. The use of metal dies was stated to produce lens surfaces which are not suitable for photographic applications. The method involves eight steps: (1) a chunk of glass is placed into a mold; (2) a chamber surrounding the mold is first evacuated and then a reducing gas is introduced therein; (3) the mold temperature is raised to about the softening point of the glass; (4) a load is applied to the mold to shape the glass; (5) the temperature of the mold is reduced to below the transformation range of the glass, while maintaining the load on the mold to prevent distortion of the shaped glass body; (6) the load is removed; (7) the mold is further cooled to about 300° C. to inhibit oxidation of the glasslike carbon; and, (8) the mold is opened. Glass lenses so produced were asserted to be essentially strain free such that no further annealing was necessary.

U.S. Pat. No. 3,844,755 is drawn to an apparatus and method for transfer molding glass lenses. The method contemplates eight steps: (1) placing a gob of optical glass in a transfer chamber fabricated from glass-like carbon; (2) heating the chamber to first evacuate the air therefrom and then introducing a reducing gas therein; (3) heating the chamber to about the softening point of the glass; (4) applying a load to the softened glass to cause it to flow through sprues into mold cavities defined by glasslike carbon surfaces which shape the glass; (5) reducing the temperature of the chamber to below the transformation temperature of the glass, while maintaining the load to prevent distortion of the shaped glass body; (6) removing the load; (7) further cooling the chamber to about 300° C. to inhibit oxidation of the glasslike carbon; and, (8) opening the mold.

U.S. Pat. No. 3,900,328 provides a general description of molding glass lenses utilizing molds fabricated from glasslike carbon. Thus, the patent discloses placing a portion of heat-softened glass into the cavity of a mold prepared from glasslike carbon, applying appropriate amounts of heat and pressure to the mold, while maintaining a non-oxidizing atmosphere in the vicinity of the mold, cooling and opening the mold, and then removing the finished lens therefrom.

U.S. Pat. No. 4,073,654 is concerned with the press forming of optical lenses from hydrated glass. The process comprehends placing granules of hydrated glass into a mold, drawing a vacuum on the mold, heating the mold to a sufficiently high temperature to sinter the granules into an integral shape while the mold is sealed to prevent escape of water vapor therefrom, applying a load to the mold, releasing the load from the mold and opening the mold. Suggested mold materials included glasslike carbon, tungsten carbide, and alloys of tungsten.

U.S. Pat. No. 4,139,677 describes press forming and transfer molding of glass lenses simulating the method of U.S. Pat. Nos. 3,833,347 and 3,844,755 above, but utilizing silicon carbide or silicon nitride as the glass contacting material of the molds, rather than glasslike carbon.

European Patent Application 19342 discloses the isothermal pressing of glass lenses at temperatures above the softening points of the glasses, i.e., at temperatures where the glasses exhibit viscosities of less than $10^{7.6}$ poises. There is no discussion of the manner in which the pressed lenses are cooled to room temperature so it must be assumed that the "conventional" practice was utilized.

In summary, the prior art relating to the isothermal pressing of glass lenses has generally involved pressing at temperatures at or above the softening point of the glass with annealing of the lenses under load within the mold. It is quite apparent that, by its very nature, the process is slow. That is, the pressing cycle involving the time required for inserting the glass into the mold, pressing, annealing in the mold, and removal of the lens from the mold is undesirably long.

SUMMARY OF THE INVENTION

The present invention is an improvement upon the known process for isothermally pressing glass objects which improvement yields shapes of exceedingly high precision and reproducibility, provides press cycling times of much shorter duration, and permits the use of a wide range of mold materials. In its broadest aspects, the inventive method comprises seven general steps:

(1) a glass preform is prepared having an overall geometry closely similar to that of the desired final object;

(2) a mold is prepared having the precise internal configuration of the desired final object;

(3) said preform is exposed to a temperature at which the glass exhibits a viscosity within the interval of no less than about $10^8$ poises nor more than about $10^{12}$ poises;

(4) said mold is exposed to a temperature at or in the vicinity of that of said preform;

(5) with said preform in said mold while said preform is within said viscosity interval, a load is applied to said mold for a period of time sufficient to bring said mold and said preform, in at least the vicinity of said mold, to approximately the same temperature and to shape said preform into conformity with said mold; and then (6) said glass shape is removed from said mold at a temperature where said glass exhibits a viscosity of less than $10^{13}$ poises, and thereafter (7) said glass shape is annealed.

The nature of the mold material is not critical; it must be capable of accepting a good surface finish, be essentially inert to the glass, and have sufficient rigidity to retain the surface figure at pressing temperatures. In particular, problems of replicating detrimental features of the mold surface, such as the crystal structure of metal molds, have not been encountered in the inventive process. Hence, a wide variety of mold surface materials is available. Those which can be used include several 400 series stainless steels, electroless nickel, beryllium nickel alloys, tungsten carbide, alloys of noble metals such as platinum, rhodium, and gold, and fused silica. Glasslike carbon, silicon carbide, and silicon nitride molds are also operable but the present process does not require the use of such expensive materials. The mold surfaces may be in the form of either bulk material or coatings on an appropriate substrate.

In carrying out the inventive molding process, a body of optical quality glass is prepared through melting a batch therefor in a conventional manner. The weight of the glass body must be closely controlled, the weight range being determined by the design of the article to be molded. Furthermore, the shape of the body is fashioned to minimize inclusion of optical inhomogeneities. Hence, the glass body is shaped to minimize trapping of gas in the mold cavities. For example, where a convex surface is to be molded, the glass body should have a curve sharper than that of the mold cavity so that it will contact the center of the mold cavity first. Of course, gas trapping can also be avoided via the traditional method of venting the mold, but this procedure generally leads to the development of defects on the optical surface. Within this constraint, the geometry of the glass body or preform will match the configuration of the mold as closely as possible. Such close matching results in the fastest, most balanced pressing, and provides a means for preventing the development of fins on the final article. Finally, in the most preferred embodiment, the glass preform will exhibit little surface roughness. The molding process will improve the surface finish of the glass body, but excessive roughness can lead to surface inclusions and optical inhomogenoities.

A wide variety of temperatures and molding pressures may be employed successfully to form glass articles of high precision, provided that certain minimum criteria are met:

First, the molding operation will be conducted at temperatures at which the glass has a much higher viscosity when compared with customary glass pressing procedures. Thus, the glass will be molded at viscosities of about $10^8$–$10^{12}$ poises, with the preferred range being about $10^8$–$5 \times 10^{10}$ poises. Any glass composition may be deemed a candidate for the inventive molding process, provided a mold material is available which is capable of being fashioned into a good surface finish, is sufficiently refractory to withstand the pressing temperature, and is not substantially attacked by the glass composition at molding temperatures.

Second, the inventive molding operation will involve an ostensibly isothermal condition during the period wherein the final figure of the shaped article is being formed. As employed herein, the term isothermal means that the temperature of the mold and that of the glass preform, at least in the vicinity of the mold, are approximately identical. The temperature differences permitted are dependent upon the overall size and specific design of the final glass shape, but the difference will, preferably, be less than 20° C. and, most desirably, less than 10° C. This isothermal condition will be maintained for a period of sufficient length to allow the pressure on the molds to force the glass preform to flow into conformity with the surface of the mold.

Normally, the glass products molded in accordance with the inventive process contain too much thermal stress to be suitable for use in optical applications and, therefore, a fine annealing step is demanded after molding. Because of the isothermal environment utilized in the pressing procedure, however, and the fact that the molded articles essentially totally conform to the mold surfaces, the articles shrink isotropically, thereby permitting them to be fine annealed without any significant distortion of the relative surface figure. Moreover, this annealing without distortion can be achieved outside of the mold with no elaborate physical support for the molded shape. This practice leads to much shorter mold cycle times and precludes the need for recycling the molds. In sum, there is no need to cool the mold under load with the glass shape retained therewithin to a temperature below the transformation range or transition temperature of the glass. That is, the molds can be held at temperatures where the glass is at a viscosity of no more than $10^{13}$ poises (the minimum temperature at which the pressed articles are removed from the molds), rather than cooling the molds below the transformation range, perhaps even to room temperature, and then reheating. Such cycling consumes much energy and adversely affects the life of the molds.

Laboratory experience has indicated that dimensional tolerances finer than 0.1% and surface figure tolerances finer than 0.2 $\lambda$/cm in the visible range of the radiation spectrum can be achieved in the inventive process.

DESCRIPTION OF THE PREFERRED EMBODIMENTS

The specific structure of the molding apparatus is not critical to the operation of the inventive process. The press must contain some mechanism for moving the molds against the glass preform and some constraints against the motion of the molds. Such constraints are demanded to achieve the geometrical relationships required among the optical surfaces. It will be appreciated that such constraints may be constructed in a wide variety of ways. Two apparati developed in the laboratory for molding lenses are illustrated schematically in FIGS. 1 and 2, but they must be deemed exemplary only and not limiting. Hence, for example, the addition of mechanisms for automatic loading and unloading of the glass, alternative sources of heating, cooling, and press motion, and assignment of the essential functions to separate or different mechanical elements are considered to be well within the technical ingenuity of the worker of ordinary skill in the art.

Figure 1:
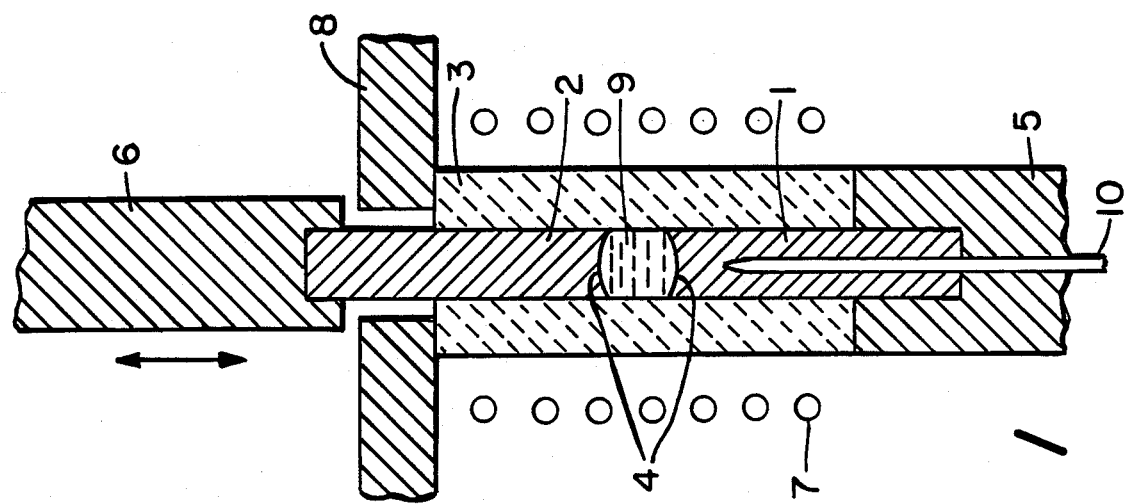
FIG. 1 depicts a laboratory apparatus suitable for molding glass bodies.

In FIG. 1, the molds 1 and 2 resemble pins which slide inside a bushing 3. The optical surfaces or mold cavities 4 are fabricated in the ends of the molds. The geometrical relationship of the optical surfaces to each other, i.e., the tilt and centration, and to the lens mounting surface is controlled by the fit of the molds within the bushing. In this apparatus, mold carriers 5 and 6 attached to hydraulic cylinders (not shown) provided the motion to the molds. The lower hydraulic cylinder moves lower mold 1 and bushing 3 into an induction heating coil 7 and holds bushing 3 against a frame 8. The upper cylinder forces upper mold 2 against the glass preform 9, causing it to flow. Heating is provided via induction heating and cooling is supplied by natural convection. The temperature of the assembly is monitored and controlled by thermocouple 10 in bottom mold 1.

Figure 2:
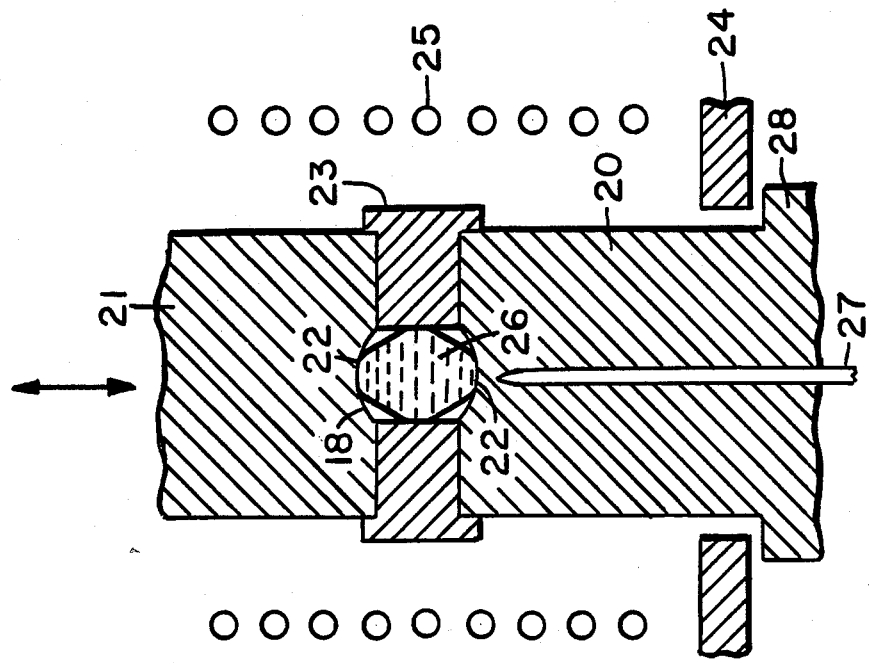
FIG. 2 represents another laboratory apparatus suitable for molding glass bodies.

In FIG. 2, the molds 20 and 21 resemble plates with the optical surfaces or mold cavities 22 fabricated into the faces thereof. Molds 20 and 21 butt into a recess in a ring 23. The faces of the recess control tilt; the edges of the recess control centration. The molds are attached to hydraulic cylinders (not shown) which impart motion thereto. The hydraulic cylinder moves lower mold 20 upward into contact with frame 24 and into an induction heating coil 25. They upper hydraulic cylinder forces upper mold 21 against glass preform 26. The molds and glass preform are subjected to induction heating and cooling is provided by natural convection. The temperature within the assembly is monitored and controlled by thermocouple 27.

The apparati illustrated in FIGS. 1 and 2 demonstrate two fundamentally different types of pressing operation. In FIG. 1, the volume of the assembly cavity is variable. The molds continue to move until the flowing glass completely fills the cavity. The thickness of the resulting lens is determined by the volume of glass in the mold assembly. In FIG. 2, the molds close to a stop so the volume of the cavity in the assembly is fixed. Customarily, the volume of the glass preform placed in the mold assembly will not completely fill the cavity. This factor results in some free glass surface not constrained by the mold being present on the glass, as indicated by 18 in FIG. 2. The thickness of the lens is governed by the thickness of ring 23. High precision glass articles displaying accurate surface figures suitable for optical lenses have been molded in the laboratory utilizing both methods and apparati, but use of the apparatus represented in FIG. 1 is preferred.

The apparatus depicted in FIG. 1 may also be employed to press glass bodies with a free surface, provided an external stop is attached to the mold carrier. The capability of achieving an accurate surface figure in contact with the mold, while a portion of the surface of the glass is unconstrained, is advantageous in furnishing a mechanism for inhibiting the development of a fin on the glass shape. A fin is a thin, fragile appendage resulting from glass flowing into a crack between two separate pieces of a mold assembly. Fins can give rise to checks, cracks, abrasion, and contamination in a pressing process, as well as cosmetic defects.

In the actual operation of the presses depicted in FIGS. 1 and 2, the glass preform, lower mold, and bushing or ring are assembled together manually. The lower hydraulic cylinder moves this assembly into the induction heating coil. The upper mold is thereafter brought into close proximity of the glass. An appropriate temperature-pressure sequence is applied to the molds and glass preform. Subsequently, the upper mold is raised, the remaining assembly lowered below the heating coil, and the shaped article removed manually and transferred to a fine annealer. Depending upon the materials employed in the construction of the apparatus and the temperatures utilized in the pressing step, it may be advantageous to surround the molding mechanism in a non-oxidizing environment to protect the high polish and high tolerance surfaces from changes due to oxidation.

Whereas the nature of the induction heating disclosed in FIGS. 1 and 2 precludes the likelihood of the temperature of the glass preform differing substantially from that of the mold, that illustrative form of heating should not be deemed to restrict the scope of the invention. For example, it is possible to introduce relatively hot glass into colder molds and thereafter be pressed in a manner such that final conformity of the glass to the mold surface occurs only after the necessary isothermal conditions have been achieved.

Under isothermal conditions, the flow of the glass preform to conform to the mold is controlled by the following equation:

$$\frac{t_o P}{\mu} = C \text{ (mold shape, starting glass shape)}$$

where $t_o$ is the time required for conformity, P is the hydrostatic pressure in the glass as it is fully pressed and equals the pressing force divided by cavity surface area, and $\mu$ is the viscosity of the glass. The value of C depends upon the difference between the shape of the mold cavity and the starting shape of the glass, the smaller the difference, the smaller the value of C. Any combination of $t_o$, P, and $\mu$ yielding the appropriate value of C may be employed to mold the article. For practical reasons, combinations yielding low values of $t_o$ (pressing time) are to be preferred. Such combinations are highly dependent upon the value of C. This is illustrated in Example 3, infra, which describes circumstances wherein conformity is achieved at very high glass viscosities because the configuration of the mold surface and the geometry of the glass preform are quite close. By means of similar arguments, it is believed apparent that the pressing pressure, P, appropriate for precision molding can vary quite broadly. Practical levels range from about 1–50,000 psi with the preferred interval encompassing about 500–2500 psi.

EXAMPLE 1

A batch for a glass consisting essentially, in weight percent on the oxide basis, of about 47.6% $P_2O_5$, 4.3% $Na_2O$, 2.1% $Li_2O$, 23% $BaF_2$, and 23% PbO was melted by conventional means in a platinum crucible. Because it is not known with which cation(s) the fluoride is combined, it is simply tabulated as $BaF_2$, the actual batch ingredient employed to incorporate fluoride into the glass composition. A bar of glass was cast from the melt and then shaped into a preform having a volume equal to and a geometry similar to that of a desired lens, utilizing forming and shaping technology well known to the glass art. The apparatus pictured in FIG. 1, supra, was assembled in the manner described above. Molds having a 10 mm diameter were fabricated from 420M stainless steel with aspheric surface cavities appropriate to a particular lens design. The bushing was made from tungsten carbide. The assembly was housed in a glove box containing a reducing gas, viz., 92% $N_2$ and 8% $H_2$.

The mold assembly with the preform therein was heated within the induction coil to 331° C. and soaked for five minutes at that temperature to insure thermal equilibrium. That temperature corresponded to a glass viscosity of about $9 \times 10^8$ poises. A force equivalent to 1300 psi was applied to the mold for one minute. The load was released and the mold assembly then cooled rapidly to 280° C., where the glass exhibited a viscosity of about $10^{12}$–$10^{13}$ poises, the mold disassembled, the resulting lens removed therefrom and placed on its side on a ceramic plate, and the plate and lens transferred to an annealer operating at about 280° C. The annealer utilized an air atmosphere and cooled the lens to room temperature at about 50° C./hour.

Upon being tested via transmission interferometry at a numerical aperture of 0.4, the RMS optical path difference between the incoming and existing wavefront was about 0.050λ. Hence, the optical performance of the lens is substantially better than the customarily accepted diffraction limit criterion of 0.074λ.

EXAMPLE 2

A glass preform was prepared having the same composition and being shaped in like manner to the practice described above in Example 1. The press depicted in FIG. 1 was assembled with 10 mm diameter molds having spherical cavities coated with a platinum-rhodium-gold alloy and the bushing being fabricated from tungsten carbide. The mold assembly with the preform therein was heated to 338° C. in the ambient environment, that temperature corresponding to a glass viscosity of $2 \times 10^8$ poises, and soaked for five minutes. A force equivalent to 550 psi was applied to the molds for 25 seconds. With the load still in place, the mold assembly was cooled rapidly to 288° C., this temperature corresponding to a glass viscosity of $10^{11}$ poises, and then immediately disassembled with the lens being transferred to an annealer. The surface of the lens deviated from spherical by somewhat more than one wavelength.

EXAMPLE 3

The conditions of Example 2 were repeated except that the mold assembly was held under load at 288° C. for five minutes before disassembly. The f 0.8 spherical surface of the lens replicated the mold to within 0.21λP-P and 0.030 λ RMS.

P-P means peak-to-peak. The expression represents the difference between the maximum and minimum values of the population. Hence:

$$P\text{-}P = x_{max.} - x_{min.}$$

RMS signifies root-mean-square. The expression designates the square root of the mean of the square of the difference between the values of the population and its mean. Hence:

$$RMS = \sqrt{\frac{\sum_i (x_i - x)^2}{n}} \quad \text{where } x = \frac{\sum x_i}{n}$$

It appears that where, as in Example 2, the mold is cooled under pressure, the glass both differentially shrinks away from the mold during cooling because of differences in thermal expansion existing between the glass and mold, and tries to flow back into conformity with the mold surface because of the pressure being applied thereto. These circumstances lead to the development of a lens having a distorted surface figure. In contrast, Example 3 demonstrates that the application of a hold under load at a low temperature, but whereat the glass exhibits a viscosity no greater than $10^{12}$ poises, for a sufficient length of time to achieve isothermal conditions, allows the glass to conform to the mold, thereby resulting in the production of a lens having a good surface figure.

EXAMPLE 4

A glass pellet was cast from a melt and shaped into a preform in like manner to the procedure described above in Example 1, the glass having the composition described in Example 1. The apparatus depicted in FIG. 2 was assembled, the molds and ring being fabricated of 400 series stainless steels, and the entire assembly with the preform therein being enclosed in a glove box containing a reducing gas, viz., 94% $N_2$ and 8% $H_2$.

The assembly was heated to 319° C. ($\sim 3 \times 10^9$ poises) and soaked at that temperature for four minutes. A force equivalent to 500 psi was applied to the molds for one minute. With the load still in place, the mold assembly was cooled to 280° C. ($\sim 7 \times 10^{11}$ poises), that temperature held for about five minutes, the assembly thereafter disassembled, and the lens transferred to an annealer operating at about 270° C. The surface of the annealed lens replicated the mold surface to better than 0.25λ P-P. Both of the molding steps were undertaken under isothermal conditions. That practice is not mandatory. The second or final pressing must be conducted under isothermal conditions to secure a true surface figure, but the first pressing need not be.

EXAMPLE 5

A glass preform shaped as biconvex with a radius of curvature of 24.0 mm was prepared utilizing 24 mm diameter molds in a similar manner to that described in Example 1 from a composition consisting essentially, in weight percent on the oxide basis, of about 5.9% PbO, 19.2% $K_2O+Na_2O+CaO$, 7.9% $B_2O_3$, and 67% $SiO_2$. An apparatus paralleling that illustrated in FIG. 1 was assembled utilizing spherical molds fabricated from tungsten carbide.

The preform was placed inside the mold and the assembly heated to 635° C., at which temperature the glass demonstrates a viscosity of $10^9$ poises. A load of 850 atmospheres (12,328 psi) was applied to the mold for two minutes. With the load in place, the mold assembly was cooled to 570° C. where the glass manifests a viscosity of $10^{13}$ poises. The load was removed by lifting upper mold 2 and the lens annealed while resting upon lower mold 1.

Interferometric measurements of the finished lens evidenced excellent reproducibility.

EXAMPLE 6

A glass preform of the same geometry and prepared in a similar manner as that described in Example 5 was formed from a composition consisting essentially, in weight percent on the oxide basis, of about 1% MgO, 27% CaO +BaO +$Na_2O+K_2O$, 0.7% $Al_2O_3$, 0.7% $B_2O_3$, 0.6% $Sb_2O_3$, and 70% $SiO_2$. Utilizing the same molding assembly as reported in Example 5, the preform was placed inside the mold and the assembly heated to 650° C., at which temperature the glass exhibits a viscosity of $5 \times 10^8$ poises. A load of 900 atmospheres (13,053 psi) was applied to the mold for two minutes. The mold assembly was cooled to 538° C. where the glass demonstrates a viscosity of $10^{13}$ poises under a gradually decreasing load such that at 538° C. the load was zero. Upper mold 2 was lifted and the lens annealed while resting upon lower mold 1.

Interferometric examination of the finished lens indicated excellent reproducibility.

EXAMPLE 7

A glass preform of the same geometry and prepared in a similar manner as that described in Example 5 was formed from a composition consisting essentially, in weight percent on the oxide basis, of about 2% $Na_2O$ +$K_2O$, 70.5% PbO, 0.5% $B_2O_3$, and 27% $SiO_2$. Employing the same molding assembly as that utilized in Example 5, the preform was placed inside the mold and the assembly heated to 525° C., at which temperature the glass displays a viscosity of $10^9$ poises. A load of 800 atmospheres (11,603 psi) was applied to the mold for two minutes. With the load in place, the mold assembly was cooled to 445° C. where the glass evidences a viscosity of $10^{13}$ poises. The load was removed by lifting upper mold 2 and the lens annealed while resting upon lower mold 1.

Interferometric inspection of the finished lens denoted excellent reproducibility.

Whereas in Examples 2–7 the load employed in the pressing step was maintained at the same level or gradually decreased as the mold assembly was cooled to a temperature at which the glass exhibited a viscosity of about $10^{11}$–$10^{13}$ poises, that practice is not necessary. A force must be applied which is sufficient to hold the glass shape in conformity with the mold, but such load can be considerably less than that utilized in pressing. Forces greater than the pressing load can likewise be used but for no practical advantage.

Also, although in the above Examples the preform was placed into the mold and the temperature thereof raised in concert with the mold, that practice is not a required feature of the inventive process. Thus, the preform and mold can be heated to the desired temperature apart from each other and brought together only at the time a load is applied to the mold.

Whereas articles demonstrating excellent surface figures can be produced most rapidly through a single-step, isothermal pressing at temperatures where the glass exhibits a viscosity within the interval of $10^8-5\times10^{10}$ poises and the article is immediately removed from the mold assembly, the best surface figures are generated when the final surface figure is achieved at temperatures where the glass is at a viscosity between about $10^{11}-10^{12}$ poises. As would be expected, the time demanded for the pressing operation at those temperatures becomes quite long. Consequently, a two-step process, such as is described above in Example 3, comprises the preferred practice. Thus, an initial pressing is undertaken for a brief period at temperatures where the glass is at a viscosity of about $10^8-10^{10}$ poises and, thereafter, the force is maintained on the mold while it is quickly cooled to a temperature where the glass is at a viscosity of about $10^{11}-0^{12}$ poises. After a relatively brief hold at such a temperature to insure isothermal conditions, the article is removed from the mold. Long hold periods do not adversely affect the character of the shaped body but are not economically desirable.

An alternative process for conducting the preferred two-step molding process involves the use of two sets of molds. The first set would be utilized at temperatures where the glass preform is at a viscosity of about $10^8-10^{10}$ poises. After pressing at a temperature within that range, the preform would be removed from the molds without cooling and with only a potential slight loss of surface figure. The glass preform would thereafter be introduced into a second set of molds and exposed to temperatures where the glass is at a viscosity of about $10^{11}-10^{12}$ poises. A second pressing at those temperatures trues up the surface figure without demanding long molding times, because the amount of flow experienced by the glass would be very small. The second pressing step must be carried out under isothermal conditions whereas such are not required in the first pressing.

As observed above, essentially any glass can be molded into shapes of high precision and excellent surface figure provided mold material is available which is sufficiently refractory and inert to the glass. For practical reasons, pressing temperatures between 100°–650° C. and, preferably, between about 250°–450° C. are highly desirable. Accordingly, glass compositions demonstrating viscosities between $10^8-10^{12}$ poises at temperatures over the interval of 100°–650° C. and, preferably, between about 250°–450° C. satisfy those desiderata. Phosphate-based glass compositions are recognized in the glass art as commonly possessing low transition temperature. Such glasses lend themselves well to the inventive molding technique. However, phosphate-based glasses are also known in the glass art as frequently exhibiting poor chemical durability.

U.S. application Ser. No. 124,924, filed Feb. 26, 1980 in the names of A. R. Olszewski, L. M. Sanford, and P. A. Tick, discloses glass compositions within the alkali metal aluminofluorophosphate system demonstrating transition temperatures below 350° C. and good weathering resistance which consist essentially, as analyzed in weight percent on the oxide basis, of 30–75% $P_2O_5$, 3–25% $R_2O$, wherein $R_2O$ consists of 0–20% $Li_2O$, 0–20% $Na_2O$, 0–20% $K_2O$, 0–10% $Rb_2O$, and 0–10% $Cs_2O$, 3–20% $Al_2O_3$, and >3% but <24% F, the atomic ratio F:Al being between 1.5–5 and the atomic ratio R:P being less than 1. Because of their overall properties, those glasses are considered to be the most preferred compositions for use in the inventive process.

In the above specific working examples, articles were molded in laboratory apparati under different thermal conditions corresponding to a range of glass viscosities. Nevertheless, the most ideal situation from a practical point of view involves the use of a minimum dwell time. Molding viscosities within the range of about $10^8-10^{12}$ poises can be tailored to provide such a minimum dwell time.

Molding at temperatures where a glass exhibits a viscosity less than $10^8$ poises can be undertaken, but that practice hazard such difficulties as proper glass homogeneity and unwanted flow of glass between clearances in the molding assembly resulting in fins on the edge of the pressed product. Conversely, molding at glass viscosities in excess of $10^{12}$ poises demands high pressing forces and extended dwell times, and frequently leads to glass breakage because of its resilient behavior.

We claim:

1. A method of molding to form a glass lens which method comprises:

forming a glass preform of desired configuration, providing a mold assembly having a mold cavity therein, preheating said preform and said mold assembly, placing the preform within the cavity of said mold assembly initially pressing said preform within the cavity of the said mold assembly by providing a force on the mold assembly, said initial pressing being carried out at temperatures wherein the glass of said preform is at a viscosity of about $10^8-10^{10}$ poises, maintaining a force on the mold assembly while it is cooled to a temperature where the glass is at a viscosity of about $10^{11}-10^{12}$ poises, holding the pressed lens within said mold assembly for a time sufficient to provide an isothermal condition for the mold and the lens and removing the pressed lens from said mold assembly.

2. A method of molding a glass lens as defined in claim 1 where the step of forming said glass preform includes casting a glass pellet from a melt and shaping said glass pellet.

3. A method of molding a glass lens as defined in claim 1 including the step of providing the mold assembly with a mold cavity of predetermined fixed volume therein.

4. A method of molding a glass lens as defined in claim 3 including the step of pressing said preform within said cavity to a stop abutment means for fixing the volume of said mold assembly cavity.

5. A method of molding a glass lens as defined in claim 1 including the step of including a ring means as part of said mold assembly for determining the thickness of said molded glass lens.

* * * * *